Nov. 30, 1965 L. E. MADANSKY 3,220,903

METHOD OF FABRICATING EDGE-LIGHTED PANELS

Filed June 11, 1962 2 Sheets-Sheet 1

INVENTOR
Leslie E. Madansky
By Smyth, Roston & Pavitt
Attorney

Nov. 30, 1965 L. E. MADANSKY 3,220,903

METHOD OF FABRICATING EDGE-LIGHTED PANELS

Filed June 11, 1962 2 Sheets-Sheet 2

INVENTOR:
Leslie E. Madansky

By Smyth, Roston & Pavitt
Attorneys 3,220,903
METHOD OF FABRICATING EDGE-LIGHTED PANELS

Leslie E. Madansky, Burbank, Calif., assignor to California Plasteck, Inc., Reseda, Calif., a corporation of California Filed June 11, 1962, Ser. No. 201,425
11 Claims. (Cl. 156—83)

This invention relates to a method of fabricating a trans-illuminated panel of the general type disclosed in the Sullivan Patent No. 2,602,036. Panels of this type have designs thereon comprising such components as indicia, letters, numerals, pipe diagrams and like markings, which designs are visible both by reflected light and by illumination through the material of the panel. Trans-illuminated panels of this character are commonly used for instrument panels on aircraft.

In general, a panel of this type comprises a laminated plate having a relatively thick inner main layer of light-transmitting material and having an outer or front layer of opaque material which has cutouts conforming to the desired design. Usually a thin intermediate layer of light-reflecting translucent material underlies the outer opaque layer and is exposed through the design cutouts.

In one prior art procedure, a thick panel of transparent plastic material is sprayed with flat white pigmented epoxy resin on both of its faces which is then cured to provide the desired thin intermediate translucent layer. Then a silk screen process is utilized to apply to the translucent layer an image of the desired design, the image material being what is variously known as a "parting agent," "resist" or "repellant." Heretofore, a parting agent having a relatively low melting point has been used such as a material obtainable from the Warnow Process Paint Company, under the designation "Cat-L-Ink Resist 50-115."

After the silk screen application of the parting agent to produce the design image, approximately five minutes is allowed for solvent evaporation and then the whole panel, including the parting agent image, is sprayed with flat black pigmented epoxy. After an allowance of five minutes for solvent evaporation, the black epoxy is completely cured with heat to provide the desired thin outer opaque coating.

The final step is to remove the fully cured black epoxy from the design areas that are defined by the printed parting agent. This step consists in submerging the panel in aliphatic naphtha for several minutes for solvent action on the parting agent image to loosen the cured black epoxy over the area of the image and then scrubbing the panel with a medium hard bristle brush to remove the loosened black epoxy to expose the underlying white translucent layer over the image area.

The described prior art process is acceptable for many purposes but it has not been successful where fine image definition is required. For example where the desired pattern of the cutouts in the outer opaque layer includes exceedingly thin lines or has portions depicted by minute dots for half-tone effects, the result has been disappointing.

Upon analysis and careful study it is found that a number of factors contribute to the difficulty. One factor that has been discovered is that a parting agent such as specified above cold flows starting immediately after its application by the silk screen technique. The consequent minute distortion and diffusion of the printed image makes accurate sharp definitions in the final design impossible.

A second factor is that the solvent does not readily penetrate the cured outer opaque epoxy layer to reach the parting agent freely for full solvent action on the parting agent and consequently minute portions of the opaque layer that overlie the parting agent are not removed as required for full development of the desired cutout design. A third factor is that the rubbing action required to remove the opaque epoxy from the parting agent areas to develop the design is so vigorous that it removes adjacent minute areas of the opaque layer that should not be removed.

The first problem, then is to obtain a clean cut and precisely defined pattern of the positive parting agent under the outer opaque layer. The second problem is to remove all of the outer opaque layer over the areas of the parting agent without removing adjacent areas of the opaque layer.

The first problem is solved by using for the parting agent, a suitable composition having a melting point substantially higher than the atmosphere of the environment and substantially higher than the temperature of the panel. The new parting agent is heated above its melting point to make it fluid and the heated fluid parting agent applied to the panel in the pattern of the desired design with resulting instantaneous solidification of the parting agent by loss of heat to the relatively cool panel and by loss of heat to the relatively cool atmosphere of the environment. This technique avoids departure from the applied design by flow of the applied parting agent.

To carry out this concept a heated screen for the screen printing operation is employed to keep the high melting composition heated above its melting point up to the moment of actual application to the relatively cool panel. For this purpose, a metal screen is incorporated in an electric circuit for resistance heating of the metal screen.

The second problem is met by only partly curing the outer opaque epoxy layer prior to the step of removing the epoxy from the areas of the parting agent, the curing of the epoxy layer being completed subsequently after this step. Only partially curing the epoxy layer leaves it porous for ready penetration of the solvent to the underlying parting agent and the softened parting agent immediately swells to cause numerous small fractures in the superimposed epoxy layer. It is important to note, moveover, that partially cured epoxy is softer than fully cured epoxy and more easily fractured by the swelling parting agent. As a result, the subsequent rubbing action required to remove the fractured epoxy from the areas of the parting agent is so mild that it has no effect on the adjacent areas of the incompletely cured epoxy.

The described improved procedure solves the problem of accurate definition of the cutout design but it has been found that a further difficulty remains in that more efficient bonding of the underlying thin translucent layer to the main transparent layer of the panel is required to keep the translucent layer undisturbed throughout the above-described procedure. This further difficulty is met by providing the main transparent layer with a roughened surface for more effective bonding engagement by the translucent layer. The roughened surface may be accomplished by sand blasting the main transparent layer but a feature of the invention is that this end is achieved without an additional sand blasting operation.

The invention takes advantage of the fact that it is desirable to embed printed circuit conductors in the main transparent layer by the simultaneous application of heat and pressure before the translucent epoxy is applied to the opposite faces of the main layer. The invention teaches that the embossing platens employed for the application of heat and pressure may have sand blasted surfaces to emboss corresponding minutely irregular surfaces on the two faces of the main transparent layer. The applied heat not only softens the surface of the transparent material of the main layer for the creation of a sand blasted effect on the surface and for embedding the printed circuit conductors, but also serves to sinter the printed circuit material.

The features and advantages of the invention may be understood from the following detailed description and the accompanying drawings.

In the drawings, which are to be regarded as merely illustrative:

Figures 1, 2, 3, 4, 5, 6, 7, 8, 9, 10, 11, 12, 13:
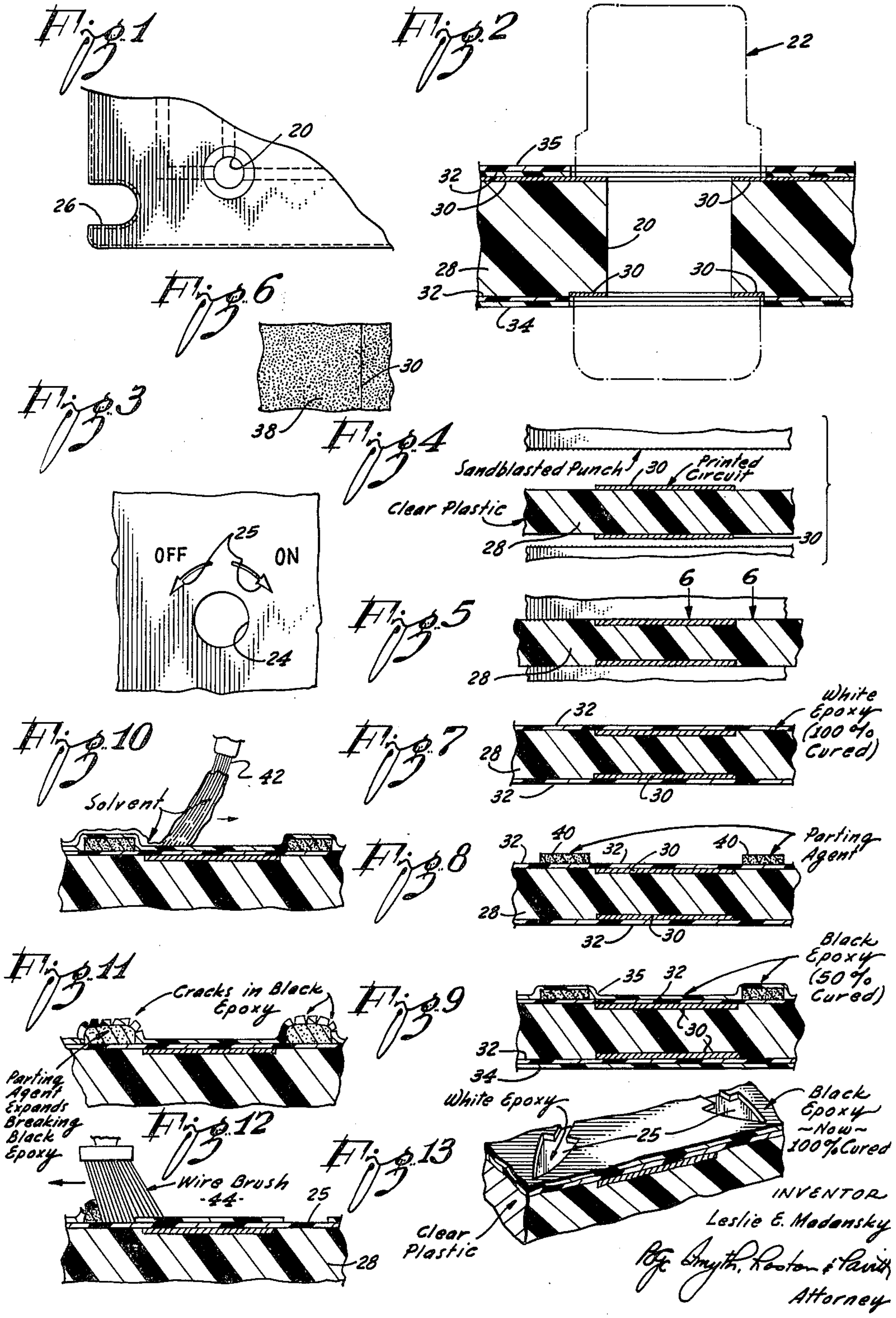
FIG. 1 is a fragmentary plan view of a panel ready for the installation of lamps.
FIG. 2 is an enlarged fragmentary section of the panel with an installed lamp shown in phantom.
FIG. 3 is a plan view of a portion of the finished panel showing indicia thereon.
FIG. 4 is a fragmentary sectional view showing the unfinished panel with a pair of platens positioned in preparation for the embossing step.
FIG. 5 is a similar view illustrating the embossing step.
FIG. 6 is a plan view of a portion of the unfinished panel after the embossing step showing the sand blasting effect that is produced by the embossing step.
FIG. 7 is a view in section illustrating the next step of applying the epoxy layers to the two faces of the main layer.
FIG. 8 is a similar view showing the parting agent applied in the desired pattern.
FIG. 9 is a similar view illustrating the next step of applying a layer of black epoxy over the parting agent and partially curing the black epoxy to leave the epoxy porous.
FIG. 10 is a similar view illustrating the next step of applying solvent to the porous incompletely cured epoxy layer.
FIG. 11 is a similar view showing how the application of the solvent causes the solvent to penetrate the porous epoxy layer to reach the underlying parting agent to cause the parting agent to soften and swell with consequent fracturing of the overlying black epoxy layer.
FIG. 12 is a similar view illustrating the final step of removing the fractured epoxy material by means of a wire brush.
FIG. 13 is a fragmentary perspective view showing the resulting sharply defined cutout design.

The drawings show, by way of example, how the invention may be applied to the construction of a panel of the character described and having at least one aperture 20 shown in FIGS. 1 and 2 to receive a lamp 22 that is shown in phantom in FIG. 2. In addition this particular panel has a bore 24 to receive a shaft for controlling a switch by means of a knob (not shown) on the front of the panel. As shown in FIG. 3, the indicia design on the front of the panel includes a pair of arcuate arrows 25 adjacent the bore 24 and includes indicia in the form of the words "off" and "on" associated with the two arrows. The panel is further provided with two or more marginal recesses 26 for use in mounting the panel.

As shown in FIG. 2 the finished panel has a relatively thick main layer 28 of suitable light-transmitting or transparent plastic material such as methyl methacrylate, which is commonly sold under the trade names "Plexiglas" and "Lucite." Printed circuit material 30 is embedded in the surface of the main layer 10 on the opposite faces of the layer for energizing the lamp bulb in the lamp housing 22 and the opposite faces of the main layer including the embedded printed circuit material are covered by thin white translucent epoxy layers 32. Finally, the rear face of the panel is covered with an opaque layer of black epoxy 34 and the front face of the panel is covered with a similar black epoxy layer 35 which has cutouts to form the desired design including the two arrows 25 and the letters shown in FIG. 3.

Starting with a plate 28 of transparent plastic of a required configuration in plan to form the main layer of the panel, the printed circuit material 30 is applied as suitable layers to the opposite faces of the plate, as shown in section in FIG. 4. The plate is then placed between two electrically heated platens or embossing dies 36 each of which has a sand blasted surface 38. The transparent plate with the printed circuit material thereon is then placed under high pressure by the two platens 36 in the manner shown in FIG. 5, the pressure of the heated platens being sufficient to cause the printed circuit material 30 on the opposite faces of the transparent plate to be embedded flush with the surface of the plate. The pressure and the temperature of the two platens are also sufficient to cause the sand blasted faces of the two platens to produce corresponding sand blasting effects on the two opposite faces of the main layer 28, the sand blasted effect being shown in FIG. 6 as extending not only over the surface of the transparent plastic material but also as extending over the surface of the embedded printed circuit material 30. The heat supplied by the heated platens also sinters the printed circuit material.

The next step is to apply the two translucent layers 32 as shown in FIG. 7 and to cure the applied white epoxy. Then a pattern of the parting agent is applied to the translucent layer on the front face of the panel with the pattern of the parting agent conforming to the desired pattern of cutouts. FIG. 8 shows portions of the applied parting agent 40.

FIG. 9 illustrates the next step of applying the back face layer of black epoxy 34 and the front face layer of black epoxy 35, the front layer covering the areas of the parting agent 40. The black epoxy coating is only partly cured, say approximately 50 percent cured, and then the solvent for the parting agent is applied to the uncured epoxy in the region of the parting agent design. FIG. 10 shows how the solvent may be applied by means of a soft brush 42, but in some instances it may be desirable simply to immerse the whole panel in the solvent.

The porosity of the partially cured black epoxy permits the solvent to reach the underlying parting agent and the solvent causes the parting agent to swell. The swelling of the parting agent causes the corresponding areas of the overlying black epoxy layer 35 to crack and fissure as indicated in FIG. 11. The craftsman watches for the cracking that spreads the areas of the black epoxy coating 35 that overlie the areas of the applied parting agent 40 and leaves intact the portions of the black epoxy coating that are bonded directly to the underlying white epoxy layer 32. The black epoxy that is fractured in the region of the deposited parting agent may be removed by means of a wire brush 44 in the manner illustrated by FIG. 12. The clean cut and accurately defined manner in which the cutouts are formed in the outer opaque layer 35 in this manner is indicated by the cutout portions 25 in FIG.

13 which are portions of the previously mentioned arrows of FIG. 3.

A parting agent that has been found to be satisfactory for carrying out the described process comprises in parts by weight:

60 parts microcrystalline wax, grade 2 (derived from petroleum)
5 parts silicone grease
5 parts plastisol
10 parts pine rosin
20 parts of a filler, such as aluminum oxide This parting agent has a melting point of approximately 145° F. and is rigidly solid at room temperature. The supply of the parting agent for carrying out the screen process may be maintained at a temperature of approximately 150° F. and the wire screen used for the screen process may be electrically maintained at a slightly higher temperature.

Any suitable solvent may be used for dissolving action on the parting agent in the final operation of removing the cutout portions of the outer opaque epoxy coating. For example, a satisfactory solvent for this purpose comprises:

| | Percent |
|---|---|
| Toluene | 42 |
| Methyl isobutyl ketone | 48 |
| Butyl Cellosolve | 5 |
| Methylethyl ketone | 5 |

Another solvent that may be used is sold under the trade name "Chlorothene" by the Dow Chemical Company.

Figure 14:
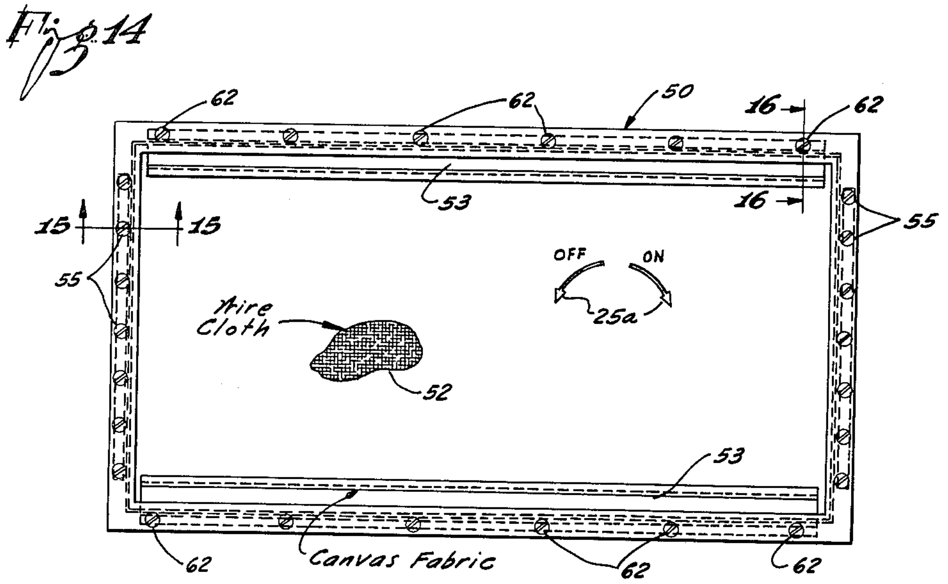
FIG. 14 is a plan view of an electrically heated screen for applying the high melting parting agent.
Figure 15:
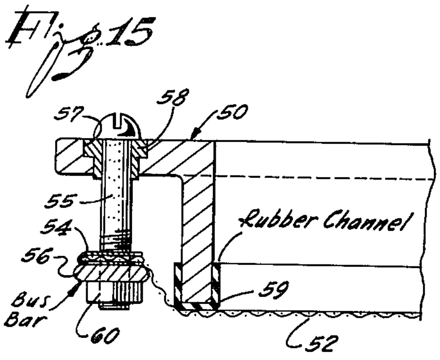
FIG. 15 is an enlarged fragmentary section along the line 15—15 of FIG. 14.
Figure 16:
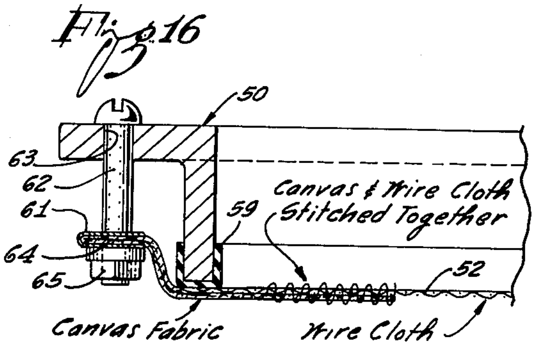
FIG. 16 is an enlarged fragmentary section along the line 16—16 of FIG. 14.

The stencil screen employed in the process may be of the construction shown in FIGS. 14, 15 and 16. In this construction, the stencil screen includes a metal rectangular frame 50 of interconnected angle members. The screen proper comprises a length of wire cloth 52 and strips 53 of canvas or the like sewn to the longitudinal margins of the wire screen for insulating purposes.

Each end of the wire cloth 52 is finished by a folded strip 54 of sheet metal which is clamped over the end of the wire screen and is suitably bonded thereto by welding or brazing. For the purpose of anchoring the two ends of the wire cloth to the rectangular frame 50, each of these folded metal strips 54 has a plurality of apertures to receive a plurality of bolts 55. As shown in FIG. 15, a bus bar 56 underlies each of the folded metal strips 54 co-extensive therewith and is apertured in the same manner to receive the bolts 55.

Each end of the rectangular frame 50 has a plurality of counter-sunk bores 57 corresponding to the bolt apertures in the corresponding folded metal strip 54 and the corresponding bus bar 56. The bolts 55 are mounted in the counter-sunk bores 57 and are insulated from the metal frame 50 by means of suitable bushings 58 of non-conducting material. The wire cloth 52 passes under the ends of the metal frame 50 and is insulated from the metal frame by channel-shaped members 59 of rubber or other suitable material that embrace the lower edges of the angle members. With the bolts 55 seated in the counter-sunk bores 57 and with the bolts extending through the apertures in the folded metal strips 54 and the apertures in the bus bar 56 at the opposite ends of the frame, nuts 60 on the lower ends of the bolts 55 are screwed onto the bolts to place the wire screen 52 in drum-tight longitudinal tension.

The canvas strips 53 along the opposite side margins of the wire screen 52 may be attached to the side members of the metal frame 50 in much the same manner. In the construction in FIG. 16, the canvas strips 53 pass under the channel-shaped insulating members 59 and terminate in longitudinal folded metal strips 61 that are firmly bonded to the side edges of the canvas. These longitudinal folded metal strips 61 have spaced apertures to receive suitable bolts 62 and the side members of the metal frame 50 have corresponding bores 63 to receive the bolts. The bolts 62 carry suitable washers 64 and nuts 65. The nuts 65 are tightened to place the wire cloth 52 under drum-tight lateral tension.

The wire cloth 52 is covered with masking material that serves as a stencil for a screen printing technique in a well known manner, the mask material having cutouts including cutouts 25*a* corresponding to the previously mentioned arcuate areas 25. The manner in which such a stencil mask may be provided by a photographic emulsion is well known in the art and need not be described.

Figures 17, 18, 19:
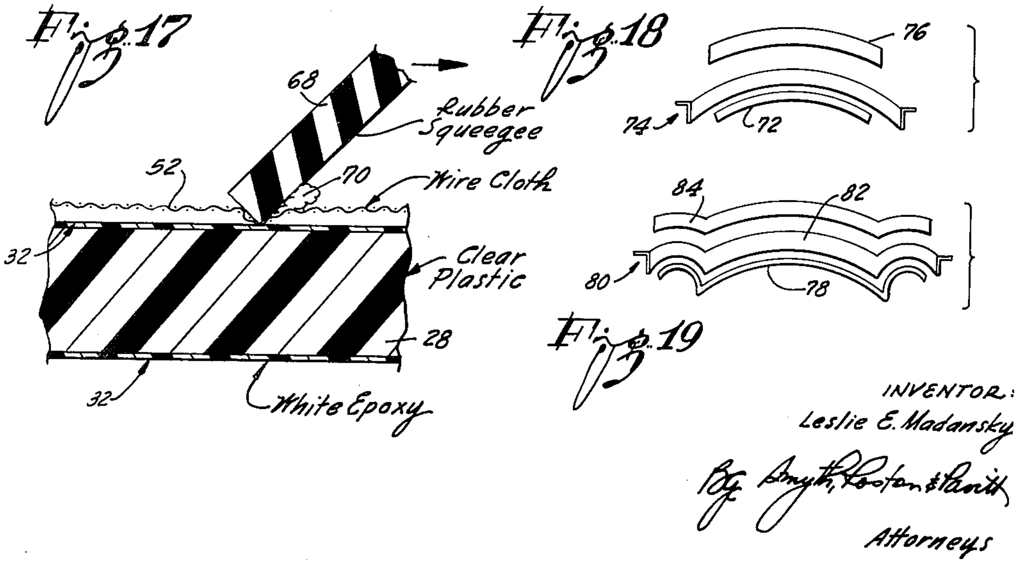
FIG. 17 is an enlarged sectional view showing how a moving squeegee flexes a portion of the screen into momentary contact with the panel.
FIG. 18 is a diagrammatic transverse cross-sectional view illustrating a practice of the invention in which a transversely curved panel is processed by a similarly curved heated wire screen and squeegee.
FIG. 19 is a similar view of a panel of complex transverse circular configuration together with a heated wire screen and squeege for processing the panel.

To carry out the operation of applying the parting agent design, a plate 28 of the transparent plastic for the main layer of the panel with the white epoxy layers 32 thereon is positioned under the wire cloth 52 parallel thereto in the manner indicated in FIG. 17. The distance between the white epoxy surface of the plate 28 and the drum-tight wire cloth 52 is only close enough to permit the wire cloth to be flexed into contact with the white epoxy coating. A suitable quantity of the hot melted parting agent is placed on the upper surface of the wire cloth 52 and is distributed over the area of the wire cloth by a single rapid stroke of a rubber squeegee 68.

FIG. 17 shows how a quantity 70 of the hot parting agent is moved across the wire cloth and is distributed therethrough by the leading edge of the squeegee 68. The squeegee must be kept at an elevated temperature between operations and for this purpose may be kept immersed in the heated supply of the parting agent.

Each portion of the wire cloth 52 that is flexed against the white epoxy coating 32 by the rapid traverse of the squeegee 68 makes only momentary contact with the white epoxy in depositing the parting agent thereon. Consequently, the deposited parting agent is instantly isolated from the heated wire cloth 52 and instantly loses heat to the relatively cool epoxy coating 32 and to the relatively cool ambient atmosphere. With this quick cooling action, the parting agent instantly solidifies to maintain the sharpness of the applied design. An important advantage of using a high melting parting agent is that since it solidifies instantly, no special care is required to avoid smearing the printed parting agent design. The panels may be stacked on each other as fast as they are printed with the parting agent.

The epoxy material is a condensation polymer of epechlorohydrin and Bis Phenol A. The curing agent in the epoxy coating may be the type known to the trade as "Finch Curing Agent," the active ingredients of which are primary and/or secondary diamines.

A fast drying solvent is desirable for the epoxy coating to minimize the solvent effect on the applied design. A suitable solvent comprises

| | Percent |
|---|---|
| Ethyl alcohol | 50 |
| Normal butyl alcohol | 10 |
| Toluene | 25 |
| Ethylene glycol monobutyl ether acetate | 15 |

FIG. 18 shows how the invention may be applied to the production of a panel 72 of the character described that is arcuate in transverse cross sectional configuration. A special electrically heated wire screen, generally designated 74 is provided for applying the pattern of parting agent to the surface of the curved panel. The wire screen 74 is of the general construction heretofore described except that the two opposite end members 75 of the screen are curved to conform to the arcuate cross sectional configuration of the panel 72. The longitudinal wires of the screen that extend between the two end members 75 are pulled taut to a relatively high tension to maintain the screen at the desired transverse arcuate configuration conforming to the arcuate cross sectional configuration of the panel 72, but the transverse wires of the screen are not under tension. A squeegee 76 for use with the screen 74 is of the same arcuate configuration as the panel 72 and the wire cloth of the screen for the purpose of carrying out the screen printing step in the manner heretofore described.

FIG. 19 shows a panel 78 of complicated transverse cross sectional curvature and shows a screen, generally designated 80, for processing the panel. The screen is of the previously described construction with the two end members 82 of the screen frame of the same complicated curvature as the cross section of the panel 78. A squeegee 84 for use with the screen 80 is of the same complicated curvature. Here again the longitudinal wires of the screen are under high tension to maintain the required configuration, the transverse wires of the screen being under little or no tension.

My description in specific detail of the selected practices of the invention will suggest various changes, substitutions and other departures from my disclosure within the spirit and scope of the appended claims.

I claim:

1. In a method of fabricating a panel to provide a design thereon for illumination therethrough, including the steps of applying to a panel a coating of a parting agent conforming to the pattern of the design, applying to the panel a coating of opaque epoxy to cover both the applied parting agent and the background area of the design, applying to the epoxy coated panel a solvent for the parting agent, and then applying friction to remove the opaque epoxy from the area of the solvent-treated parting agent, the improvement for accuracy and sharpness of definition of the final design which consists in:

using a parting agent having a melting point substantially higher than the atmosphere of the environment and higher than the temperature of the panel;

raising the temperature of the parting agent above its melting point to make the parting agent fluent;

applying the heated fluent parting agent to the panel in a pattern conforming to the desired design with resulting instantaneous solidification of the parting agent by loss of heat to the relatively cool panel and loss of heat to the relatively cool atmosphere of the environment and consequent avoidance of subsequent flow of the applied parting agent;

covering the face of the panel including the pattern of parting agent with a layer of opaque epoxy;

partially curing the epoxy layer to leave the epoxy layer porous;

applying the solvent to the porous partially cured epoxy layer to pass therethrough to the underlying parting agent to soften and swell the underlying parting agent with consequent fracturing of the partially cured epoxy that overlies the parting agent;

removing the fractured partially cured epoxy layer over the areas of the applied parting agent; and then completing the cure of the remainder of the epoxy layer.

2. A method as set forth in claim 1 in which the application of the parting agent to the panel is carried out by means of a stencil screen of wire cloth with the wire cloth heated by electric current to melt the parting agent.

3. A method of fabricating a panel of the character described with a design thereon for illumination by lamp means from the interior of the panel, including the steps of:

applying conductor elements to a face of a relatively thick plate of light-transmitting thermoplastic material to form a circuit for the lamp means;

applying heat and pressure to the face of the plate to soften the material thereof and to embed the conductor elements therein substantially flush with the surface thereof;

applying a layer of translucent plastic material to the face of the plate and the embedded conductor elements;

applying a layer of parting agent to the translucent layer with the layer of parting agent conforming to the configuration of said design;

applying a layer of substantially opaque epoxy to said translucent layer and the parting agent thereon;

partially curing the epoxy layer to leave the epoxy layer porous;

applying a solvent for the parting agent to the partially cured epoxy layer to pass through the epoxy layer to the parting agent to soften the parting agent and swell the parting agent with consequent cracking of the superimposed partially cured epoxy;

removing the fractured partially cured epoxy from the areas of the parting agent to leave apertures in the epoxy corresponding to said design; and then completing the cure of the remainder of the epoxy layer.

4. A method as set forth in claim 3 in which the step of applying heat and pressure to the plate is carried out by pressing a heated embossing die against the face of the plate with the face of the embossing die having minute surface irregularities to form corresponding minute surface irregularities on the face of the plate to increase the bond between the plate and the subsequently applied translucent plastic material.

5. A method as set forth in claim 4 in which the face of the heated embossing die is sand blasted to produce the effect of sand blasting on the face of the plate.

6. A method of fabricating a panel of the character described with a design thereon for illumination by lamp means from the interior of the panel, including the steps of:

applying printed circuit material to the face of a relatively thick plate of light-transmitting thermoplastic material to form conductor elements for a circuit for energizing the lamp means;

applying heat and pressure to the face of said plate to soften the material thereof, to embed the printed circuit material in the face of the plate substantially flush therewith and to sinter the embedded printed circuit material to form conductor elements;

applying a layer of translucent plastic material to the face of the plate and the embedded conductor elements;

applying a layer of parting agent to the translucent layer with the layer of parting agent conforming to the configuration of said design;

applying a layer of substantially opaque epoxy to said translucent layer and the parting agent thereon;

partially curing the epoxy layer to leave the epoxy layer porous;

applying a solvent for the parting agent to the partially cured epoxy layer to pass through the epoxy layer to the parting agent to soften the parting agent and swell the parting agent with consequent cracking of the superimposed partially cured epoxy;

removing the cracked partially cured epoxy from the areas of the parting agent to leave apertures in the epoxy layer corresponding to said design; and then completing the cure of the remainder of the epoxy layer.

7. A method of fabricating a panel of the character described with a design thereon for illumination from the interior of the panel, including the steps of:

applying a layer of translucent plastic material to the face of a relatively thick plate of light-transmitting thermoplastic material;

applying a layer of a parting agent to the translucent layer with the layer of parting agent conforming to the configuration of said design;

applying a layer of substantially opaque epoxy to said translucent layer and the parting agent thereon;

partially curing the epoxy layer to leave the epoxy layer porous;

applying a solvent for the parting agent to the partially cured epoxy layer to pass through the epoxy layer to the parting agent to soften the parting agent and swell the parting agent with consequent cracking of the superimposed partially cured epoxy;

removing the cracked partially cured epoxy from the areas of the parting agent to leave apertures in the epoxy layer corresponding to said design; and then completing the cure of the remainder of the epoxy layer.

8. A method of fabricating a panel of the character described with a design thereon for illumination from the interior of the panel, including the steps of:

applying a heated embossing die to the face of a relatively thick plate of light-transmitting thermoplastic material with numerous minute surface irregularities in the face of the embossing die to produce corresponding numerous minute surface irregularities in the face of the plate;

applying a layer of translucent plastic material to the face of the plate;

applying a layer of parting agent to the translucent layer with the layer of parting agent conforming to the configuration of said design;

applying a layer of substantially opaque epoxy to said translucent layer and the parting agent thereon;

partially curing the epoxy layer to leave the epoxy layer porous;

applying a solvent for the parting agent to the partially cured epoxy layer to pass through the epoxy layer to the parting agent to soften the parting agent and swell the parting agent with consequent cracking of the superimposed partially cured epoxy;

removing the partially cured epoxy from the areas of the parting agent to leave apertures in the epoxy corresponding to said design; and then completing the cure of the remainder of the epoxy layer.

9. A method as set forth in claim 8 in which the face of said embossing die is sand blasted to produce the equivalent of a sand blasted surface on the face of said plate.

10. A method of fabricating the panel of the character described with a design thereon for illumination by lamp means from the interior of the panel, including the steps of:

processing one face of a plate of light-transmitting thermoplastic material to provide the face with a rough surface texture to facilitate the bonding of material thereto;

applying a layer of translucent plastic material to the face of the surface-roughened plate to form a laminated panel;

applying to the surface of the translucent layer a predetermined pattern in the form of a parting agent having a melting point substantially higher than the ambient temperature by means of a metal screen with the metal screen elevated in temperature by electric current to melt the parting agent;

covering the face of the panel including the pattern of the parting agent with a layer of opaque epoxy;

partially curing the epoxy layer to leave the epoxy layer porous;

applying a solvent to the porous partially cured epoxy layer to pass therethrough to the underlying parting agent to soften and swell the underlying parting agent with consequent fracturing of the partially cured epoxy that overlies the parting agent;

removing the fractured partially cured epoxy layer over the areas of the applied parting agent; and then completing the cure of the remainder of the epoxy layer.

11. A method of fabricating a panel of the character described with a design thereon for illumination by lamp means from the interior of the panel, including the steps of:

applying conductor elements to a face of a relatively thick plate of light-transmitting thermoplastic material to form a circuit for the lamp means;

applying a die with heat and pressure to the face of the plate to soften the material thereof and to embed the conductor elements therein substantially flush with the surface thereof, with the face of the die roughened to roughen the surface of the plate;

applying a layer of translucent plastic material to the roughened face of the plate and the embedded conductor elements to form a laminated panel;

applying to the surface of the translucent layer a predetermined pattern in the form of a parting agent having a melting point substantially higher than the ambient temperature by means of a metal screen with the metal screen elevated in temperature by electric current to melt the parting agent;

covering the face of the panel including the pattern of the parting agent with a layer of opaque epoxy;

partially curing the epoxy layer to leave the epoxy layer porous;

applying a solvent to the porous partially cured epoxy layer to pass therethrough to the underlying parting agent to soften and swell the underlying parting agent with conseqeunt fracturing of the partially cured epoxy that overlies the parting agent;

removing the fractured partially cured epoxy layer over the areas of the applied parting agent; and then completing the cure of the remainder of the epoxy layer.

References Cited by the Examiner

UNITED STATES PATENTS

| | | | |
|---|---|---|---|
| 2,561,672 | 7/1951 | Pritikin | 161—6 |
| 2,594,081 | 4/1952 | Shlenker | 161—6 |
| 2,602,036 | 7/1952 | Sullivan | 156—219 |
| 2,674,558 | 4/1954 | Neugass | 161—1 |
| 3,111,570 | 11/1963 | Strang et al. | 161—1 |

ALEXANDER WYMAN, *Primary Examiner.*

HAROLD ANSHER, *Examiner.*